(12) United States Patent
Shigemitsu et al.

(10) Patent No.: US 10,104,275 B2
(45) Date of Patent: Oct. 16, 2018

(54) MANUFACTURING METHOD FOR CAMERA MODULE, AND CAMERA MODULE

(71) Applicant: Sharp Kabushiki Kaisha, Sakai, Osaka (JP)

(72) Inventors: Norimichi Shigemitsu, Sakai (JP); Yoshihiro Sekimoto, Sakai (JP); Masahiro Nakamura, Sakai (JP)

(73) Assignee: SHARP KABUSHIKI KAISHa, Sakai (JP)

( * ) Notice: Subject to any disclaimer, the term of this patent is extended or adjusted under 35 U.S.C. 154(b) by 0 days.

(21) Appl. No.: 15/543,008

(22) PCT Filed: Nov. 24, 2015

(86) PCT No.: PCT/JP2015/082914
§ 371 (c)(1),
(2) Date: Jul. 12, 2017

(87) PCT Pub. No.: WO2016/117222
PCT Pub. Date: Jul. 28, 2016

(65) Prior Publication Data
US 2018/0007246 A1    Jan. 4, 2018

(30) Foreign Application Priority Data

Jan. 19, 2015    (JP) ................................ 2015-008150

(51) Int. Cl.
*H04N 5/225*    (2006.01)
*G02B 7/00*    (2006.01)
(Continued)

(52) U.S. Cl.
CPC .......... *H04N 5/2254* (2013.01); *G02B 7/003* (2013.01); *G02B 7/023* (2013.01); *G02B 7/025* (2013.01);
(Continued)

(58) Field of Classification Search
CPC ...... H04N 5/2254; G02B 7/025; G02B 7/023; G02B 7/003; G02B 7/021
See application file for complete search history.

(56) References Cited

U.S. PATENT DOCUMENTS 7,587,803 B2 * 9/2009 Montfort ............. H04N 5/2253
29/407.04
2009/0180021 A1 * 7/2009 Kikuchi ............. H04N 5/2253
348/349
(Continued)

FOREIGN PATENT DOCUMENTS

JP    2003-121717 A    4/2003
JP    2007-333987 A    12/2007
(Continued)

OTHER PUBLICATIONS

Official Communication issued in International Patent Application No. PCT/JP2015/082914, dated Mar. 1, 2016.

*Primary Examiner* — Padma Haliyur
(74) *Attorney, Agent, or Firm* — Keating & Bennett, LLP (57) ABSTRACT

A lens barrel (3) holding an imaging lens (2) is inserted into a carrier (5) accommodated in an actuator (4), and the carrier (5) is held at a position in an optical axis direction of the imaging lens (2) by the actuator (4). The position of the imaging lens (2) in the optical axis direction and the eccentricity of the imaging lens (2) are adjusted on the basis of imaging information of an image sensor (6), and the lens barrel (3) is fixed to the carrier (5).

3 Claims, 5 Drawing Sheets (51) Int. Cl.
*G02B 7/02* (2006.01)
*G02B 27/64* (2006.01)

(52) U.S. Cl.
CPC ......... *G02B 27/646* (2013.01); *H04N 5/2257* (2013.01); *G02B 7/021* (2013.01)

(56) References Cited

U.S. PATENT DOCUMENTS

| | | |
|---|---|---|
| 2009/0244728 A1 | 10/2009 | Tamoyama et al. |
| 2012/0316825 A1 | 12/2012 | Shigemitsu et al. |
| 2013/0314810 A1 | 11/2013 | Sekimoto et al. |
| 2015/0292867 A1 | 10/2015 | Shigemitsu et al. |

FOREIGN PATENT DOCUMENTS

| | | |
|---|---|---|
| JP | 2009-253363 A | 10/2009 |
| JP | 2009-302837 A | 12/2009 |
| JP | 2010-230910 A | 10/2010 |
| JP | 2012-256017 A | 12/2012 |
| JP | 2012-256040 A | 12/2012 |
| JP | 2013-218251 A | 10/2013 |
| WO | 2014/073262 A1 | 5/2014 |

\* cited by examiner

MANUFACTURING METHOD FOR CAMERA MODULE, AND CAMERA MODULE

TECHNICAL FIELD

The present invention relates to a method for manufacturing a camera module using active alignment (AA) for adjusting an optical axis of an imaging lens on the basis of imaging information captured by an image sensor, and the camera module.

BACKGROUND ART

The recent rapid enhancement in the resolution of camera modules has made it difficult to increase the accuracy of components in accordance with the enhancement in the resolution. Thus, an assembly process for the camera modules requires highly accurate adjustment of the optical axis between an optical imaging lens and an image sensor. Moreover, mobile applications require a reduction in height of the camera modules. Thus, the height and size of the components of the camera modules have been reduced, and such reduction is ongoing.

PTL 1 to PTL 3 each disclose a method for highly accurately assembling a camera module by adopting a configuration of a lens barrel without screws. However, according to this assembly method, a sensor cover is provided between the image sensor and the imaging lens, and therefore, a space corresponding to the sensor cover is required. Thus, the assembly method may not meet the recent demand for the reduction in height of the camera module.

Moreover, a method for adjusting the position of the imaging lens in an optical axis direction is known. However, enhancement in resolution of the image sensor requires not only the adjustment in the optical axis direction but also adjustment of the angle of tilt of the imaging lens. Thus, PTL 4 and PTL 5 each propose a method for adjusting the optical axis of the imaging lens on the basis of imaging information captured by the image sensor.

This method for adjusting the optical axis of the imaging lens on the basis of the imaging information captured by the image sensor is referred to as active alignment. The use of the active alignment enables provision of a high-quality camera module with a satisfactorily adjusted angle between an imaging lens and an image sensor (sensor). PTL 4 discloses an adjustment algorithm and also an adjustment method for adjusting the angle between an imaging lens and an image sensor. The adjustment method disclosed in PTL 4 is a method for adjusting the angle between the image sensor and an actuator in which the imaging lens is incorporated. This adjustment method is currently used in many processes.

CITATION LIST

Patent Literature

PTL 1: Japanese Unexamined Patent Application Publication No. 2012-256040 (Publication Date: Dec. 27, 2012)

PTL 2: Japanese Unexamined Patent Application Publication No. 2012-256017 (Publication Date: Dec. 27, 2012)

PTL 3: Japanese Unexamined Patent Application Publication No. 2010-230910 (Publication Date: Oct. 14, 2010)

PTL 4: Japanese Unexamined Patent Application Publication No. 2009-302837 (Publication Date: Dec. 24, 2009).

PTL 5: International Publication No. 2014/073262

SUMMARY OF INVENTION

Technical Problem

However, in the adjustment method of PTL 4, the angle between the imaging lens and the image sensor is adjusted in a state where the actuator provided in a lens unit and the image sensor provided in an element unit are separated from each other, and therefore, to enable conduction to both the actuator and the image sensor, a camera module manufacturing apparatus has to be large.

Moreover, before the adjustment of the angle between the imaging lens and the image sensor, a lens barrel holding the imaging lens has to be positioned on and fixed to a carrier accommodated in the actuator. Thus, if the imaging lens is fixed with a positional error in an optical axis direction, a prescribed stroke may be less than a stroke (movement amount) of the imaging lens in the optical axis direction from a fixation position of the imaging lens by a stroke corresponding to the positional error. Thus, the stroke margin of the imaging lens in the optical axis direction requires an additional margin corresponding to an adjustment error.

It is an objective of the present invention to provide a method for manufacturing a camera module whose stroke margin of an imaging lens in an optical axis direction may be small and which is manufacturable by a compact manufacturing apparatus, and the camera module.

Solution to Problem

To achieve the objective, a method for manufacturing a camera module according to one aspect of the present invention includes: an insertion step of inserting a lens barrel holding an imaging lens into a carrier accommodated in an actuator and holding the carrier at an arbitrary position in a direction of an optical axis of the imaging lens or in a direction normal to the optical axis by the actuator; an adjustment step of adjusting a position of the imaging lens in the direction of the optical axis and eccentricity of the imaging lens on the basis of imaging information of an image sensor that captures an image of an object through the imaging lens; and a fixation step of fixing the lens barrel to the carrier after the adjustment step, wherein the lens barrel has a connection section for connection to a manipulator configured to adjust the position of the imaging lens in the direction of the optical axis and the eccentricity of the imaging lens, and in the insertion step, the lens barrel is inserted into the carrier in such a manner that the connection section protrudes toward the object from the actuator.

To achieve the objective, a camera module according to one aspect of the present invention includes: a lens barrel holding an imaging lens; a carrier to which the lens barrel is to be fixed; an actuator configured to drive the carrier; and an image sensor that captures an image of an object through the imaging lens, wherein the lens barrel has a connection section for connection to a manipulator configured to adjust a position of the imaging lens in a direction of an optical axis and eccentricity of the imaging lens on the basis of imaging information of the image sensor before the lens barrel is fixed to the carrier, the lens barrel is in the carrier in such a manner that the connection section protrudes toward the object from the actuator.

Advantageous Effects of Invention

One aspect of the present invention produces the effect that a method for manufacturing a camera module whose stroke margin of an imaging lens in an optical axis direction may be small and which is manufacturable by a compact manufacturing apparatus, and the camera module can be provided.

DESCRIPTION OF EMBODIMENTS

Embodiments of the present invention will be described in detail below.

[First Embodiment]

Figure 1:
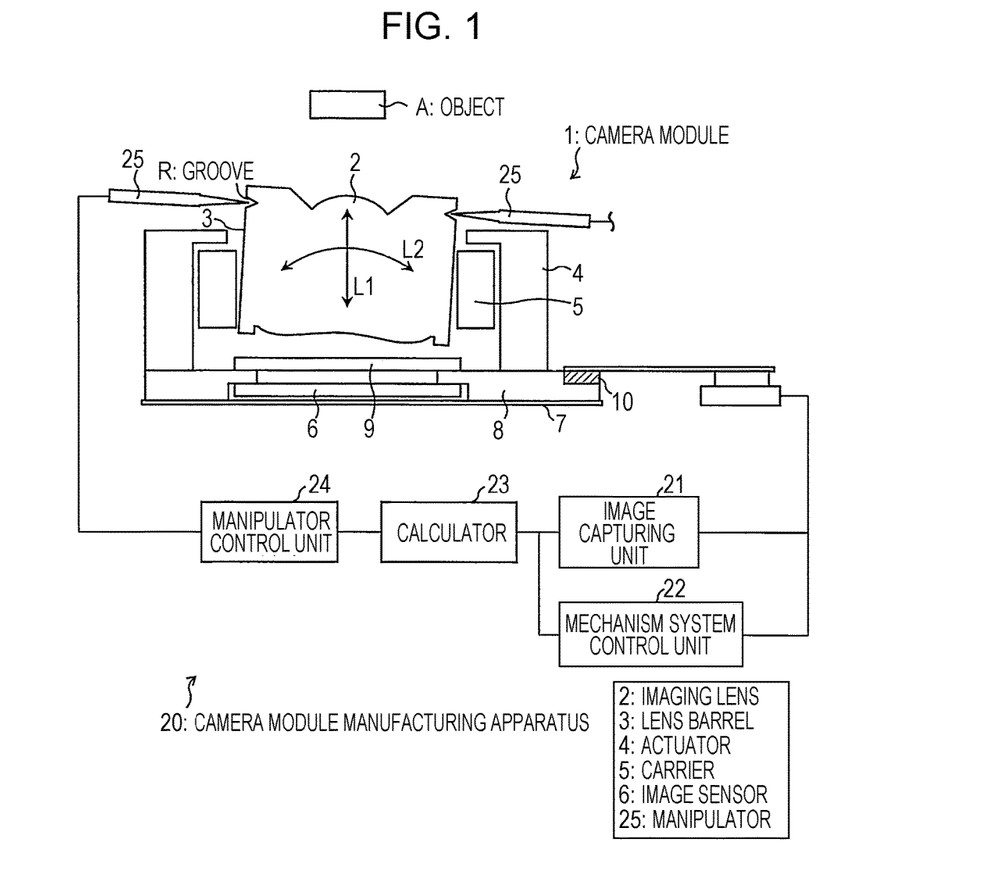
FIG. 1 is a sectional view schematically illustrating configurations of a camera module and a camera module manufacturing apparatus according to a first embodiment.
Figure 2:
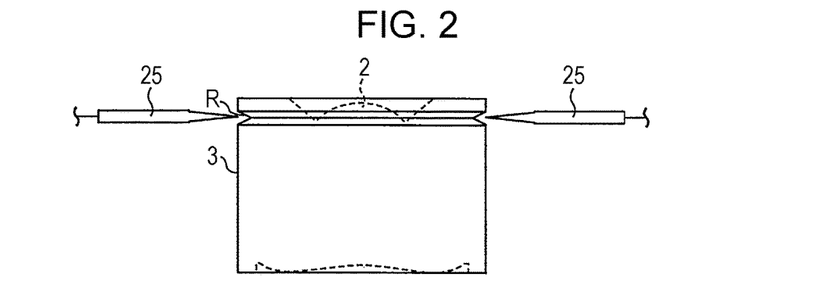
FIG. 2 is a front view illustrating a lens barrel provided to the camera module and a manipulator provided to the camera module manufacturing apparatus.

FIG. 1 is a sectional view schematically illustrating configurations of a camera module 1 and a camera module manufacturing apparatus 20 according to a first embodiment. FIG. 2 is a front view illustrating a lens barrel 3 provided to the camera module 1 and a manipulator 25 provided to the camera module manufacturing apparatus 20. The camera module 1 is a camera module provided to, for example, a mobile phone including a camera and serving as an electronic device.

(Configuration of Camera Module)

The camera module 1 includes: an imaging lens 2 that captures an image of an object A; the lens barrel 3 having a substantially columnar shape and formed around the imaging lens 2 so as to hold the imaging lens 2; a carrier 5 which has a substantially cylindrical shape, in which the lens barrel 3 is to be inserted, and to which the lens barrel 3 is to be fixed with an adhesive agent; and an actuator 4 having a substantially cylindrical shape and formed outside the carrier 5 so as to drive the imaging lens 2 along an arrow L1 representing an optical axis of the imaging lens 2. The lens barrel 3 is fixed to the carrier 5 so as to protrude toward the object A from the actuator 4.

The camera module 1 includes a substrate 7. On the substrate 7, a sensor cover 8 having an opening corresponding to the imaging lens 2 is provided. In the opening of the sensor cover 8, an image sensor 6 that performs photoelectric conversion of light that has passed through the imaging lens 2 is disposed. A glass substrate 9 is disposed so as to cover the opening of the sensor cover 8. The sensor cover 8 is provided with a connector 10 for electrical connection to, for example, a mobile phone.

(Configuration of Camera Module Manufacturing Apparatus)

The camera module manufacturing apparatus 20 includes an image capturing unit 21. The image capturing unit 21 generates imaging information by the image sensor 6 on the basis of an electric signal obtained by performing the photoelectric conversion of light that has passed through the imaging lens 2 by the image sensor 6 and supplies the imaging information to a calculator 23. The camera module manufacturing apparatus 20 includes a mechanism system control unit 22. The mechanism system control unit 22 supplies to the actuator 4 and the calculator 23 control information for controlling the position of the carrier 5.

The image capturing unit 21 is connected to the image sensor 6 via the connector 10 provided to the sensor cover 8. The mechanism system control unit 22 is connected to the actuator 4 via the connector 10.

The calculator 23 generates, on the basis of the imaging information supplied from the image capturing unit 21 and the control information supplied from the mechanism system control unit 22, an adjustment signal for adjusting by using the manipulator 25 the position of the imaging lens 2 in a direction indicated by the arrow L1 (the optical axis) and the position (eccentricity) of the imaging lens 2 in a direction indicated by an arrow L2. The calculator 23 supplies the adjustment signal to the manipulator control unit 24. The manipulator control unit 24 controls the manipulator 25 on the basis of the adjustment signal supplied from the calculator 23. The lens barrel 3 has a peripheral surface in which a groove (connection section) R for connection to the manipulator 25 is formed along a circumferential direction.

(Method for Manufacturing Camera Module)

Figure 3:
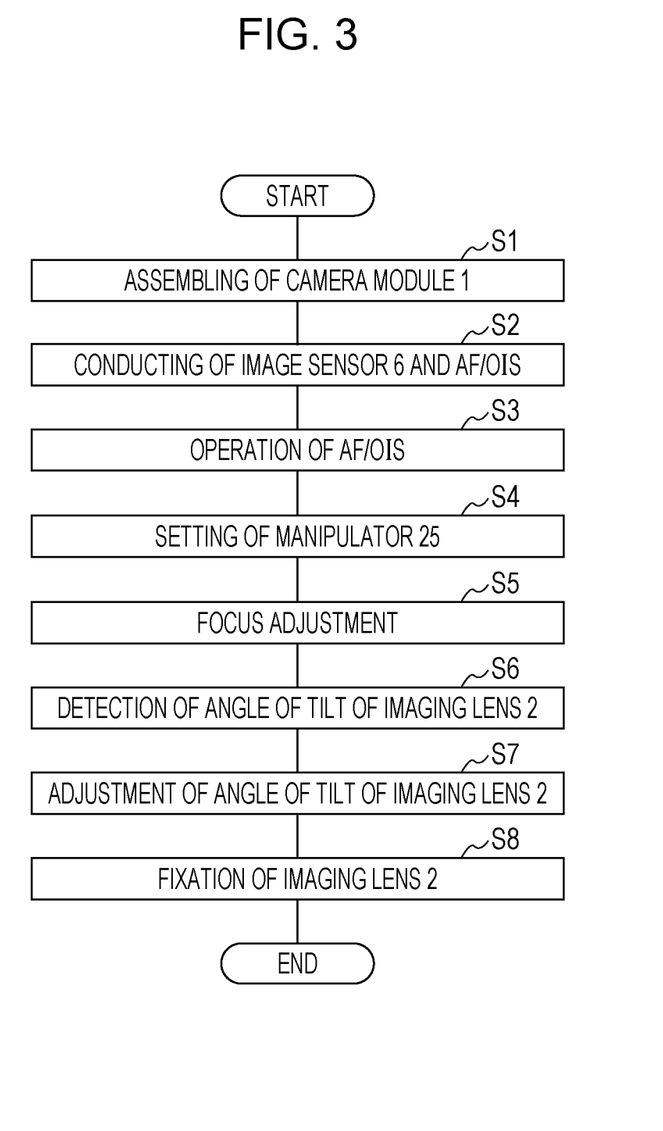
FIG. 3 is a flowchart illustrating a method for manufacturing the camera module.

FIG. 3 is a flowchart illustrating a method for manufacturing the camera module 1.

First, the camera module 1 is assembled in a state where the lens barrel 3 holding the imaging lens 2 is not fixed to the carrier 5 (step S1). That is, the sensor cover 8, the image sensor 6, the glass substrate 9, and the connector 10 are mounted on the substrate 7. Then, the actuator 4 in which the carrier 5 is accommodated is mounted on the sensor cover 8. Next, the lens barrel 3 holding the imaging lens 2 is inserted into the carrier 5. The lens barrel 3 is inserted into the carrier 5 so as to protrude toward the object A from the actuator 4.

Then, the image sensor 6 and an auto focus (AF) mechanism and an optical image stabilizer (OIS) of the actuator 4 are connected to the image capturing unit 21 and the mechanism system control unit 22 via the connector 10 and are brought into a conductive state (step S2). Next, the auto focus and the optical image stabilizer are operated so as to hold the carrier 5 at an arbitrary position in the direction of the optical axis (arrow L1) of the imaging lens 2 or in a direction (direction indicated by the arrow L2) normal to the optical axis by electrical control (step S3).

Then, the manipulator 25 is set in the groove R in the lens barrel 3 (step S4). Then, the manipulator control unit 24 controls the manipulator 25 in accordance with the adjustment signal from the calculator 23 based on the imaging information supplied from the image capturing unit 21. In this way, the manipulator 25 adjusts the position of the lens barrel 3 and moves the imaging lens 2 in a direction indicated by the arrow L1, thereby adjusting the focus of the imaging lens 2 (step S5).

Next, the calculator 23 detects the angle of tilt of the imaging lens 2 on the basis of the imaging information from the image sensor 6 (step S6). Then, the calculator 23 generates an adjustment signal for adjusting the angle of tilt of the imaging lens 2 by using the manipulator 25 and supplies the adjustment signal to the manipulator control unit 24. The manipulator control unit 24 controls the manipulator 25 on the basis of the adjustment signal supplied from the calculator 23. The manipulator 25 controlled by the manipulator control unit 24 adjusts the position of the lens barrel 3, thereby adjusting the angle of tilt of the imaging lens 2 (step S7). Next, the lens barrel 3 holding the imaging lens 2 whose angle of tilt has been adjusted by the manipulator 25 is fixed to the carrier 5 (step S8).

In this way, according to the method for manufacturing the camera module 1 according to the first embodiment, the position of the imaging lens 2 in a direction indicated by the arrow L1 (optical axis) and the position (eccentricity) of the imaging lens 2 in a direction indicated by the arrow L2 are adjusted in a state where the assembly process of the camera module 1 except for a fixing process of the lens barrel 3 to the carrier 5 is completed. Thus, the connector 10 used to incorporate the camera module 1 into, for example, a mobile phone is used to enable easy electrical connection of the image capturing unit 21 and the mechanism system control unit 22 to the image sensor 6 and the actuator 4 when adjusting the position of the imaging lens 2. Thus, it is possible to provide camera modules with excellent productivity.

In the case of the conventional technique of adjusting the angle of tilt of the actuator itself, an initial state of an adjustment target is a state in which the adjustment target is held by the manipulator, and therefore, the angle of tilt in the initial state varies widely, which requires a wide adjustment range of the angle of tilt of the actuator.

In the present embodiment, the adjustment range of the imaging lens 2 is only a range corresponding to a clearance between the carrier 5 and the lens barrel 3, and therefore, the amount of adjustment is small.

Moreover, since the position of the imaging lens in the direction of the optical axis and the eccentricity of the imaging lens 2 can be adjusted in a state where the actuator 4 is in conduction, the carrier 5 is held at an arbitrary position by the actuator 4, and then, the position in the optical axis direction of the imaging lens 2 can be adjusted. Thus, the stroke margin in the optical axis direction of the imaging lens 2 may be small.

In the above embodiment, for example, the groove R is formed in the peripheral surface of the lens barrel 3. However, the present invention is not limited to this example. It is only required that the lens barrel 3 be connectable to the manipulator 25. Thus, the peripheral surface of the lens barrel 3 may have a hole for connection to the manipulator 25.

Since the lens barrel 3 is inserted into the carrier 5 such that the groove R of the lens barrel 3 is arranged at a position so as to protrude toward the object A from the actuator 4, adjustment of the lens barrel 3 by the manipulator 25 becomes easy.

[Second Embodiment]

A second embodiment of the present invention will be described below with reference to FIGS. 4 to 5. Note that for the sake of description, members having the same functions as those described in any of the embodiments are denoted by the same reference numbers, and the description thereof will be omitted.

(Method for Manufacturing Camera Module According to Second Embodiment)

FIGS. 4(a) to 4(c) are each a front sectional view illustrating a method for manufacturing a camera module according to a second embodiment. FIG. 5 is a front view illustrating a lens barrel 3a provided to the camera module according to the second embodiment.

The lens barrel 3a has a diameter smaller at its portion adjacent to an imaging lens 2 than at its portion adjacent to an imaging sensor 6.

Figure 4:
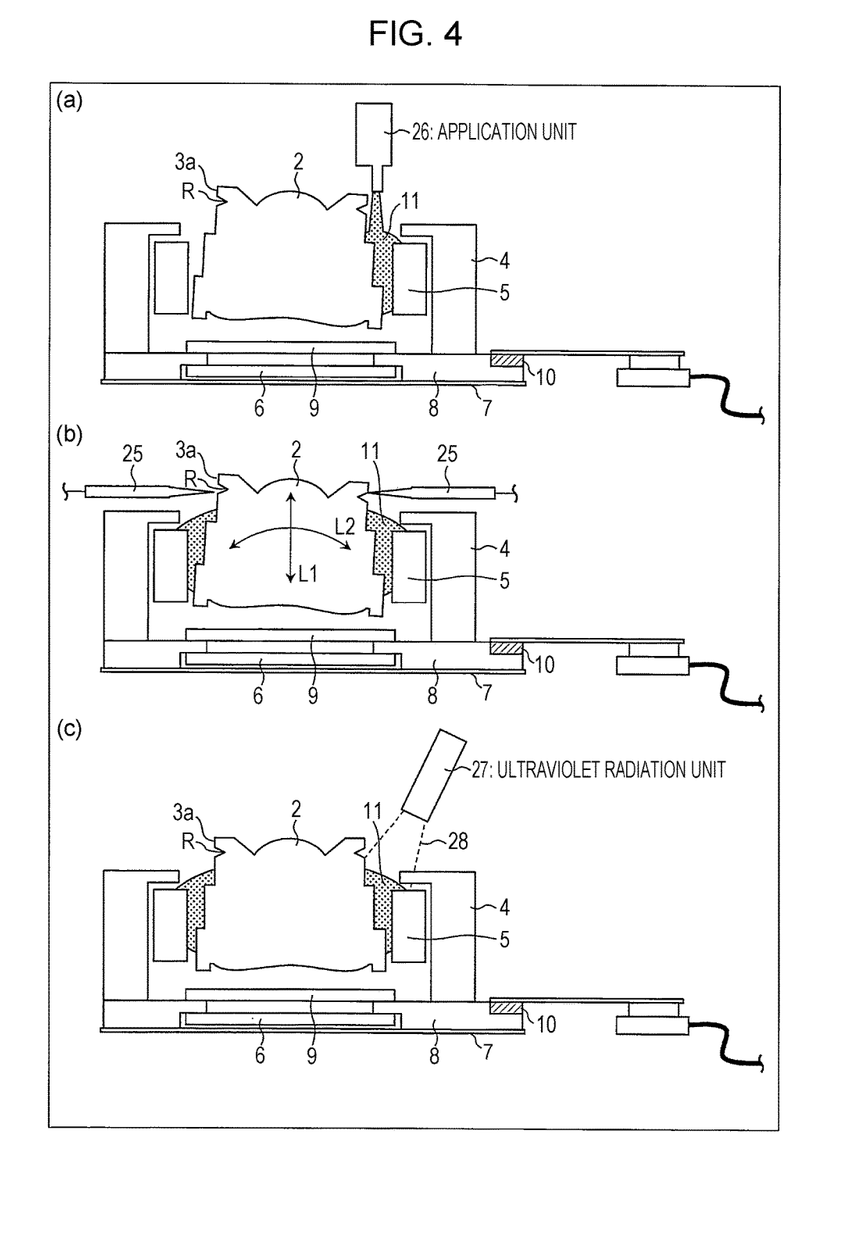
FIGS. 4(a) to 4(c) are each a front sectional view illustrating a method for manufacturing a camera module according to a second embodiment.
Figure 5:
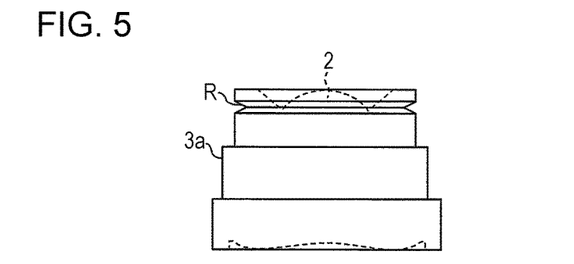
FIG. 5 is a front view illustrating a lens barrel provided to the camera module according to the second embodiment.

In the method for manufacturing the camera module according to the second embodiment, before adjusting the position of the imaging lens 2, as illustrated in FIG. 4 (a), a resin 11 is applied between an outer peripheral surface of the lens barrel 3a and an inner peripheral surface of a carrier 5 by an application unit 26.

Then, as illustrated in FIG. 4(b), a manipulator 25 adjusts the position of the imaging lens 2 held by the lens barrel 3a in a direction indicated by an arrow L1 (optical axis) and the position (eccentricity) of the imaging lens 2 held by the lens barrel 3a in a direction indicated by an arrow L2.

Next, as illustrated in FIG. 4(c), the resin 11 is irradiated with ultraviolet radiation 28 from an ultraviolet radiation unit 27 to cure the resin 11, thereby provisionally fixing the lens barrel 3a to the carrier 5. Then, the resin 11 is thermally cured in an oven at a low temperature (80° C. to 90° C.) to fully fix the lens barrel 3a to the carrier 5.

Since the diameter of the lens barrel 3a is smaller at its portion adjacent to the imaging lens 2 than at its portion adjacent to the image sensor 6, the clearance between the outer peripheral surface of the lens barrel 3a and the inner peripheral surface of the carrier 5 is larger on a side which is adjacent to the imaging lens 2 and on which the application unit 26 is to be disposed than on a side adjacent to the image sensor 6. Thus, it is possible to easily apply the resin between the lens barrel 3a and the carrier 5 by the application unit 26.

[Third Embodiment]

Figure 6:
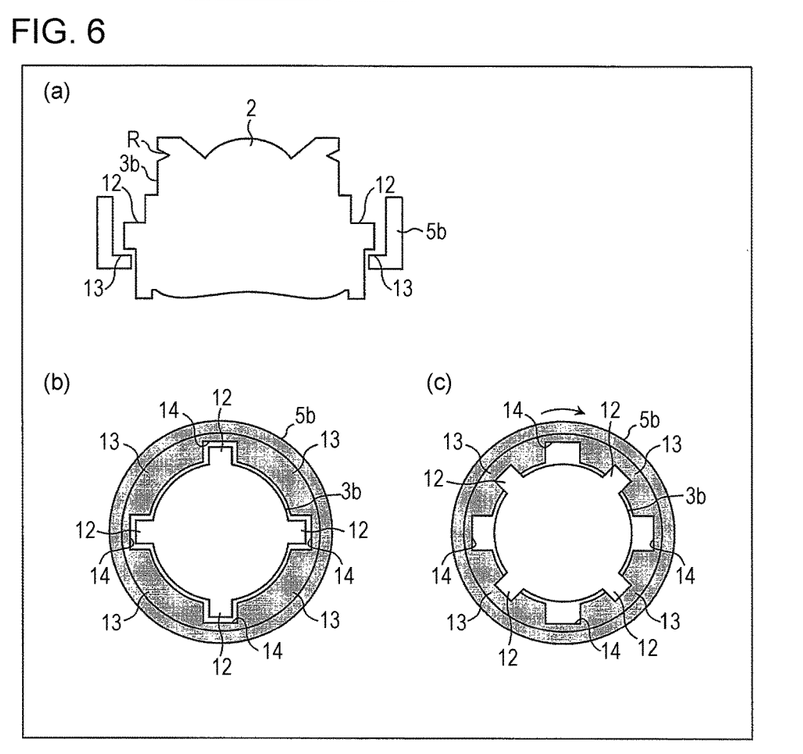
FIG. 6(a) is a front sectional view illustrating a lens barrel and a carrier provided to a camera module according to a third embodiment.
FIG. 6(b) is a plan sectional view illustrating the lens barrel and the carrier when the lens barrel is inserted in the carrier.
FIG. 6(c) is a plan sectional view illustrating the lens barrel and the carrier when the carrier holds the lens barrel.

A third embodiment of the present invention will be described below with reference to FIGS. 6 to 8. Note that for the sake of description, members having the same functions as those described in any of the embodiments are denoted by the same reference numbers, and the description thereof will be omitted.

(Configuration of Camera Module According to Third Embodiment)

FIG. 6(a) is a front sectional view illustrating a lens barrel 3b and a carrier 5b provided to a camera module according to a third embodiment, FIG. 6(b) is a plan sectional view illustrating the lens barrel 3b and the carrier 5b when the lens barrel 3b is inserted in the carrier 5b, and FIG. 6(c) is a plan sectional view illustrating the lens barrel 3b and the carrier 5b when the carrier 5b holds the lens barrel 3b.

The lens barrel 3b has four stoppers 12 diagonally protruding and arranged at equal intervals in a circumferential direction. The carrier 5b has four holding sections 13 and four insertion recesses 14 formed in an inner circumferential surface of the carrier 5b to correspond to the stoppers 12.

The lens barrel 3b is inserted in the carrier 5b such that the stoppers 12 pass through the insertion recesses 14. Then, the lens barrel 3b is rotated by about 45 degrees in the optical axis direction of the imaging lens 2 with respect to the carrier 5b, and the stoppers 12 are held in the holding sections 13. In this way, the lens barrel 3b is held by the carrier 5b.

(Configuration of Another Camera Module According to Third Embodiment)

Figure 7:
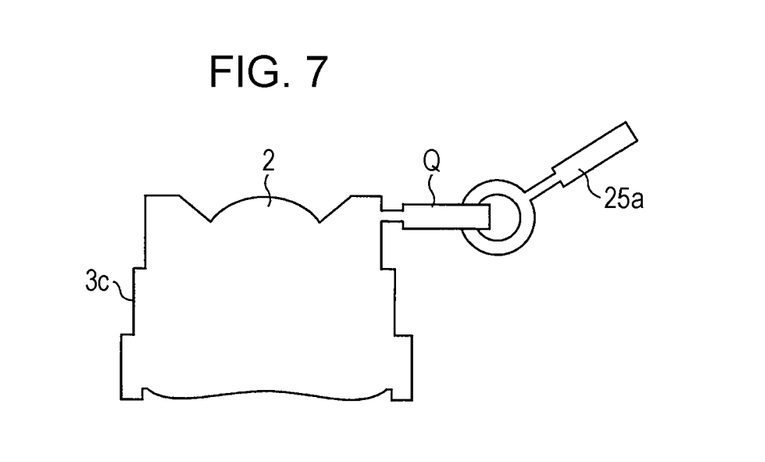
FIG. 7 is a front sectional view illustrating a lens barrel and another manipulator provided to another camera module according to the third embodiment.

FIG. 7 is a front sectional view illustrating a lens barrel 3c and another manipulator 25a provided to another camera module according to the third embodiment.

According to the method for manufacturing the camera module according to the third embodiment, the camera module is assembled with a runner (connection section) Q at the time of injection molding of the lens barrel 3c being left to the lens barrel 3c, and the manipulator 25a holds the runner Q to adjust the position of an imaging lens 2 held by the lens barrel 3c in an optical axis direction and eccentricity of the imaging lens 2 held by the lens barrel 3c. Then, after the position of the imaging lens 2 in the optical axis direction and the eccentricity of the imaging lens 2 are adjusted, the runner Q is cut and removed from the lens barrel 3c.

(Configuration of Still Another Camera Module According to Third Embodiment)

Figure 8:
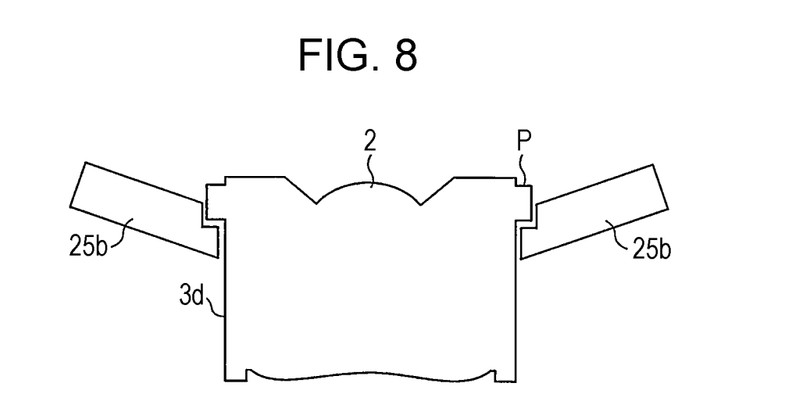
FIG. 8 is a front sectional view illustrating a lens barrel and still another manipulator provided to still another camera module according to the third embodiment.

FIG. 8 is a front sectional view illustrating a lens barrel 3d and a manipulator 25b provided to still another camera module according to the third embodiment.

The lens barrel 3d has an adjustment projection (connection section) P radially protruding outward on a side adjacent to imaging lens 2 of a peripheral surface of the lens barrel 3d. The manipulator 25b adjusts the position of the imaging lens 2 in an optical axis direction and the eccentricity of the imaging lens 2 while holding an under portion of the adjustment projection P. When the lens barrel 3d is inserted into the carrier 5, the adjustment projection P is hooked onto the carrier 5, and the lens barrel 3d is prevented from falling. In this way, the adjustment projection P also maintains the initial position with respect to the carrier.

Summary

A method for manufacturing a camera module according to a first aspect of the present invention includes: an insertion step of inserting a lens barrel 3.3a.3b.3c.3d holding an imaging lens 2 into a carrier 5.5b accommodated in an actuator 4 and holding the carrier 5.5b at an arbitrary position in a direction of an optical axis of the imaging lens 2 or in a direction normal to the optical axis by the actuator 4; an adjustment step of adjusting a position of the imaging lens 2 in the direction of the optical axis and eccentricity of the imaging lens 2 on the basis of imaging information of an image sensor 6 corresponding to the imaging lens 2; and a fixation step of fixing the lens barrel 3.3a.3b.3c.3d to the carrier 5.5b after the adjustment step.

According to the configuration, since the position of the imaging lens in the direction of the optical axis and the eccentricity of the imaging lens are adjusted in an assembled state, except for fixing of the lens barrel to the carrier, a connector used for incorporation of the camera module into, for example, a mobile terminal is used to easily enable electrical connection of the actuator and the image sensor to an adjustment device. Thus, an increase in size of the manufacturing apparatus is prevented, and it is possible to manufacture the camera module by a compact manufacturing apparatus. Moreover, after adjustment of the angle between the imaging lens and the image sensor, the lens barrel is fixed to the carrier. Thus, it is possible to avoid fixing of the imaging lens with a positional error in the optical axis direction and to prevent a state where a stroke margin in the optical axis direction of the imaging lens is additionally required. Therefore, it is possible to provide a method for manufacturing a camera module which requires only a small stroke margin.

A method for manufacturing a camera module of a second aspect of the present invention is based on the first aspect, wherein in the adjustment step, the position of the imaging lens in the direction of the optical axis and the eccentricity of the imaging lens 2 may be adjusted by a manipulator 25.25a.25b, and the lens barrel 3.3a.3b.3c.3d may have a connection section (groove R, runner Q, adjustment projection P) for connection to the manipulator 25.25a.25b.

According to the configuration, the connection section formed in the lens barrel enables easy connection of the lens barrel to the manipulator so as to adjust the position of the imaging lens in the direction of the optical axis and the eccentricity of the imaging lens.

A method for manufacturing a camera module according to a third aspect of the present invention is based on the first aspect and may further include an application step of applying a resin 11 between the lens barrel 3.3a.3b.3c.3d and the carrier 5.5b before the adjustment step, wherein the fixation step may include, after the adjustment step, a provisional fixation step of provisionally fixing the lens barrel 3.3a.3b.3c.3d to the carrier 5.5b by irradiating the resin 11, which has been applied in the application step, with ultraviolet radiation 28.

According to the configuration, before the lens barrel and the carrier are combined with each other, the resin is applied between the lens barrel and the carrier, and therefore, the resin can be easily applied in a wide space without interference of the lens barrel and the carrier with each other.

A method for manufacturing a camera module of a fourth aspect of the invention is based on the first aspect, wherein in the insertion step, the lens barrel 3.3a.3b.3c.3d may be inserted into the carrier 5.5b so as to protrude toward an object A from the actuator 4.

According to the configuration, since the lens barrel is inserted into the carrier so as to be arranged at a position where the lens barrel protrudes toward an object from the actuator, adjustment of the lens barrel by the manipulator becomes easy.

A camera module according to a fifth aspect of the present invention includes: a lens barrel holding an imaging lens; a carrier to which the lens barrel is to be fixed; an actuator configured to drive the carrier; and an image sensor that captures an image of an object through the imaging lens, wherein the lens barrel has a connection section for connection to a manipulator configured to adjust a position of the imaging lens in a direction of an optical axis and eccentricity of the imaging lens on the basis of imaging information of the image sensor before the lens barrel is fixed to the carrier.

According to the configuration, the connection section formed in the lens barrel enables provision of a camera module which enables easy connection of the lens barrel to the manipulator so as to adjust the position of the imaging lens in the direction of the optical axis and the eccentricity of the imaging lens.

The present invention is not limited to the embodiments described above. Various modifications may be made within the scope of the claims. Embodiments obtained by accordingly combining the techniques disclosed in different embodiments are also within the technical scope of the present invention. Moreover, combining technical means disclosed in the embodiments can provide new technical feature.

INDUSTRIAL APPLICABILITY

The present invention can be used in a method for manufacturing a camera module using active alignment for adjusting an optical axis of an imaging lens on the basis of imaging information captured by an image sensor and the camera module.

REFERENCE SIGNS LIST

1 CAMERA MODULE
2 IMAGING LENS
3 LENS BARREL
4 ACTUATOR
5 CARRIER
6 IMAGE SENSOR
11 RESIN
12 STOPPER LAYER
13 HOLDING SECTION
14 INSERTION RECESS
20 CAMERA MODULE MANUFACTURING APPARATUS
21 IMAGE CAPTURING UNIT
22 MECHANISM SYSTEM CONTROL UNIT
23 CALCULATOR
24 MANIPULATOR CONTROL UNIT
25 MANIPULATOR
26 APPLICATION UNIT
27 ULTRAVIOLET RADIATION UNIT
28 ULTRAVIOLET RAY
A OBJECT
P ADJUSTMENT PROJECTION (CONNECTION SECTION)
Q RUNNER (CONNECTION SECTION)
R GROOVE (CONNECTION SECTION, RECESS)
L1 ARROW
L2 ARROW

The invention claimed is:

1. A method for manufacturing a camera module that includes a lens barrel holding an imaging lens, a carrier to which the lens barrel is to be fixed, an actuator outside the carrier to drive the imaging lens along an optical axis of the imaging lens, and an image sensor that captures an image of an object through the imaging lens, the lens barrel including a connector that connects to a manipulator that adjusts a position of the imaging lens in a direction of the optical axis and an eccentricity of the imaging lens, the method comprising:
an insertion step of inserting the lens barrel into the carrier and holding the carrier at an arbitrary position in the direction of the optical axis of the imaging lens or in a direction normal to the optical axis by the actuator;
an adjustment step of adjusting the position of the imaging lens in the direction of the optical axis and the eccentricity of the imaging lens on the basis of imaging information of the image sensor; and
a fixation step of fixing the lens barrel to the carrier after the adjustment step, wherein
in the insertion step, the lens barrel is inserted into the carrier in such a manner that the connector is positioned to protrude toward the object from the actuator.

2. The method according to claim 1, further comprising:
an application step of applying a resin between the lens barrel and the carrier before the adjustment step, wherein
the fixation step includes, after the adjustment step, a provisional fixation step of provisionally fixing the lens barrel to the carrier by irradiating the resin, which has been applied in the application step, with ultraviolet radiation.

3. A camera module comprising:
a lens barrel holding an imaging lens;
a carrier to which the lens barrel is to be fixed;
an actuator outside the carrier to drive the carrier along an optical axis of the imaging lens; and
an image sensor that captures an image of an object through the imaging lens, wherein
the lens barrel includes a connector that connects to a manipulator that adjusts a position of the imaging lens in a direction of the optical axis and an eccentricity of the imaging lens on the basis of imaging information of the image sensor before the lens barrel is fixed to the carrier,
the lens barrel is located in the carrier in such a manner that the connector is positioned to protrude toward the object from the actuator.

* * * * *